W. G. VANDEGRIFT.
TIRE VULCANIZER.
APPLICATION FILED JULY 18, 1912.
1,146,538.
Patented July 13, 1915.
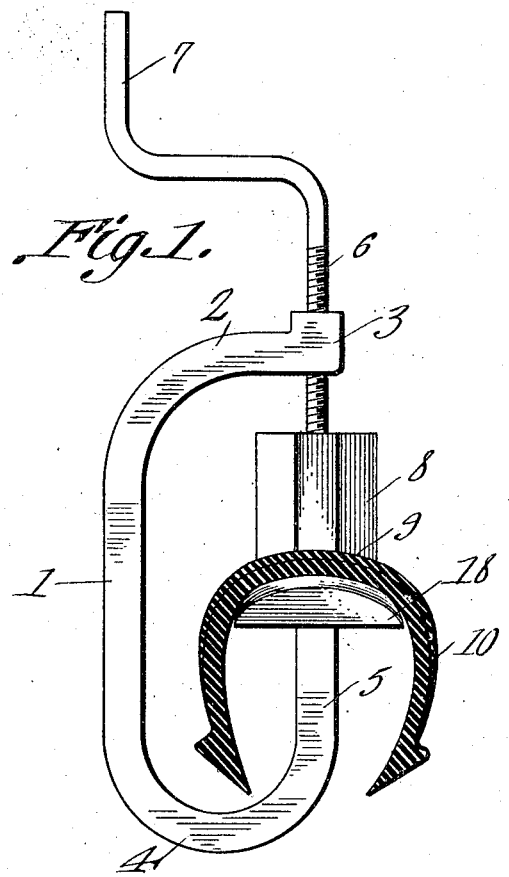
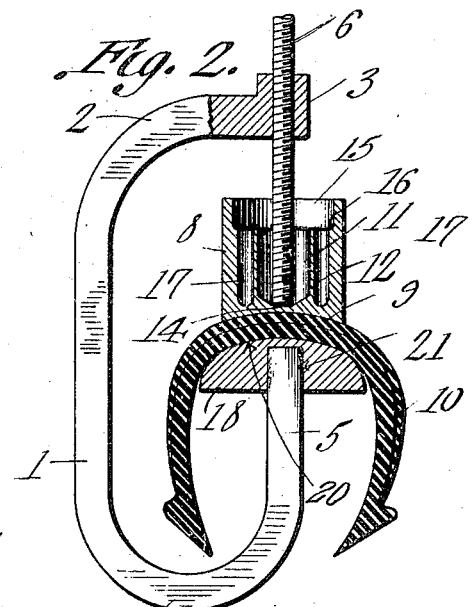
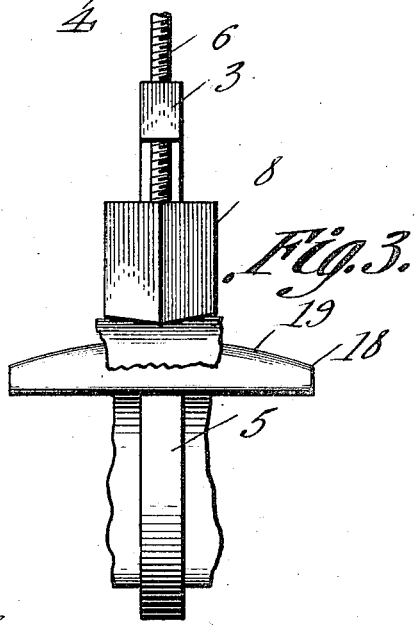
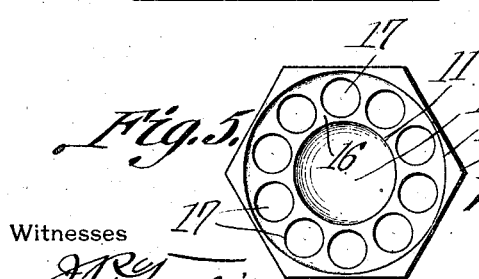
William G. Vandegrift,
Inventor
Witnesses
by
Attorneys

UNITED STATES PATENT OFFICE.

WILLIAM G. VANDEGRIFT, OF CAMP HILL, PENNSYLVANIA, ASSIGNOR OF ONE-HALF TO WILLIAM ALBRIGHT, OF HARRISBURG, PENNSYLVANIA.

TIRE-VULCANIZER.

1,146,538.  Specification of Letters Patent.  Patented July 13, 1915.

Application filed July 18, 1912. Serial No. 710,308.

*To all whom it may concern:*

Be it known that I, WILLIAM G. VANDE-GRIFT, a citizen of the United States, residing at Camp Hill, in the county of Cumberland and State of Pennsylvania, have invented a new and useful Tire-Vulcanizer, of which the following is a specification.

One object of the present invention is to provide a vulcanizer comprising coöperating upper and lower members, the upper member being provided in its upper face with a chamber, adapted to receive a liquid fuel which, when ignited, serves to heat the upper member and to effect the vulcanizing operation.

Another object of the invention is to provide a vulcanizer in which the heat of vulcanization will be retained in the tire or other article which is to be vulcanized, this result being attained by fashioning the lower coöperating member from material which is a poor conductor of heat.

Another object of the invention is to provide a novel form of vulcanizing member which will secure a thorough diffusion of heat.

Another object of the invention is to provide novel means for securing a coöperation between the upper and lower members.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in side elevation; Fig. 2 is a sectional view, parts being in elevation, and parts being removed; Fig. 3 is a fragmental elevation, the view point in Fig. 3 being at right angles to the view point in Figs. 1 and 2; Fig. 4 is a bottom plan of the lower compression member; and Fig. 5 is a top plan of the upper compression member.

In carrying out the invention there is provided a frame, denoted generally by the numeral 1, and preferably fashioned from a single piece of metal. At one end, the frame 1 terminates in a transverse arm 2 provided with an enlargement or boss 3. At its opposite end, the frame 1 is curved as indicated at 4, the curved portion 4 terminating in an arm 5 disposed at right angles to the arm 2. Into the boss 3 is threaded a screw 6, terminated in a crank 7.

The invention further includes an upper or primary member indicated generally by the numeral 8. The primary member 8 is shown in the present instance as being of hexagonal outline, although the peripheral contour of the member 8 may be changed as desired. The primary, metallic member 8 is concaved in its lower face as indicated at 9, to conform to the curvature of the tire 10 or other article which is to be vulcanized. The member 8 is equipped with a central bore 11, the lower end walls of which converge as indicated at 12, to define a seat 14, adapted to receive the inner end of the screw 6. Adjacent the free, upper end of the member 8, the bore 11 is enlarged as shown at 15 to form a fuel-receiving mouth. In the formation of the mouth 15 there is fashioned in the member 8, a transverse shoulder 16, and in the shoulder 16 are formed a plurality of openings 17, located about the central bore 11. The member 8 is thus honeycombed, to form a plurality of compartments, adapted to receive a liquid fuel, such as gasolene or the like, and owing to the honeycombed form of the member 8, the fuel is distributed throughout the member 8, and a thorough heating of the member is secured.

The invention further includes a lower or secondary member 18 which preferably is fashioned from some substance which is a poor conductor of heat, wood being selected in the present instance, although another substance may be employed when desired. The member 18 is curved longitudinally upon its upper face, as indicated at 19 and is curved transversely upon its upper face as indicated at 20 so as to conform both to the longitudinal curvature of the tire 10 and the transverse curvature thereof. In the lower face of the member 18, a socket 21 is formed, the extremity of the arm 5 of the frame 1 being received in the socket.

In practical operation, the tire 10 is saddled upon the secondary member 18, the patch is applied to the tire 10, and the screw 6 is manipulated by means of its crank 7, to force the curved face 9 of the primary member 8 down upon the upper face of the tire 10. A liquid fuel such as gasolene, is poured into the mouth 15 of the member 8, the fuel filling the bore 11 and the openings 17. Obviously, if desired, the fuel may be placed in the bore 11 alone, and upon the other hand, the openings 17, only, may be filled with fuel. In any event, the fuel, having been placed within the member 8, is ignited, and the member 8 is heated, thereby effecting a vulcanization of the tire 10. Owing to the fact that the member 8 is honeycombed, as shown, the heat is distributed equally and evenly through the member and, at the same time, the constituent metal of the member 8 is not removed to such an extent as to impair the heat-conducting qualities of the member. Owing to the fact that the secondary member 18 is fashioned from material which is a poor conductor of heat, the heat will be confined in the tire 10, during the vulcanizing operation, and will not be drawn away into and through the secondary member 18.

Having thus described the invention, what is claimed is:—

1. A vulcanizer comprising a primary compression member provided with a central bore and with mutually spaced fuel receiving openings disposed around the central bore and independent of the central bore; a secondary compression member coöperating with the primary compression member; and a clamp comprising a fixed part and a movable part, one of which parts engages the secondary compression member, the other of which parts engages the primary compression member.

2. A vulcanizer comprising a primary compression member provided with a central bore and with mutually spaced fuel receiving openings disposed around the central bore and independent of the central bore, the primary compression member including a marginal flange which upstands above the upper ends of the bore and the openings; a secondary compression member coöperating with the primary compression member; and a clamp comprising a fixed part and a movable part, one of which parts engages the secondary compression member, the other of which parts extends within the primary compression member and engages the same at the base of the bore.

In testimony that I claim the foregoing as my own, I have hereto affixed my signature in the presence of two witnesses.

WILLIAM G. VANDEGRIFT.

Witnesses:
J. S. ARNOLD,
G. HERMAN GOETZ.